United States Patent
Kuypers

[15] 3,646,972
[45] Mar. 7, 1972

[54] MULTITUBING SYSTEM
[72] Inventor: Hubert Kuypers, Bad Nenndorf, Germany
[73] Assignee: Kabel-und Metallwerke Gutehoffnungshutte Aktiengesellschaft, Hannover, Germany
[22] Filed: Feb. 27, 1970
[21] Appl. No.: 15,008

[52] U.S. Cl. ............................138/111, 174/47, 174/71 R
[51] Int. Cl. ...........................F16l 9/18, F16l 11/12
[58] Field of Search ...................138/111–117, 131, 138/129; 174/47, 71 R

[56] References Cited

UNITED STATES PATENTS

| | | | |
|---|---|---|---|
| 2,430,378 | 11/1947 | Waldron et al. | 174/41 |
| 3,192,795 | 7/1965 | Pierce | 138/129 X |
| 3,483,313 | 12/1969 | Schaffhauser | 174/47 X |
| 3,490,496 | 1/1970 | Stearns | 138/114 X |

FOREIGN PATENTS OR APPLICATIONS

| | | | |
|---|---|---|---|
| 990,594 | 4/1965 | Great Britain | 174/47 |
| 1,465,975 | 5/1969 | Germany | 174/71 |

*Primary Examiner*—Samuel B. Rothberg
*Attorney*—Philip G. Hilbert

[57] ABSTRACT

Information transmitting systems including a plurality of tubular members for pneumatically or hydraulically passing data in pulse form; the tubular members being stranded about a core member which may be tubular or in electric cable form, the tubular members being stranded with a reverse lay to allow such members to be displaced to allow convenient tapping of the tubular members or the core member.

8 Claims, 3 Drawing Figures

PATENTED MAR 7 1972　　3,646,972

INVENTOR.
Hubert Kuypers

BY

ATTORNEY

MULTITUBING SYSTEM

BACKGROUND OF THE INVENTION

Automated equipment frequently is provided with remote control means in the form of tubular members arranged to transmit test or control pulses pneumatically or hydraulically. In such data transmitting means, it is economical to bundle or aggregate a plurality of tubular members in stranded or other relations to form a single transmission unit.

Thus, in the chemical industry, test data and control pulses are transmitted pneumatically from a control location to an operating point, eliminating the possibility of explosions. Also, machine tools, power presses and other mechanical equipment are similarly controlled or tested by pneumatic means. The tubular members are of metal or synthetic resin to suit the transmitting media.

Known transmitting systems include parallel arrangement of the tubular members held together by straps. Alternatively, the tubular members are aggregated by a sprayed plastic sheathing, or they are disposed within an enveloping tube.

With such known transmitting systems, difficulties are encountered when junctions or taps are desired with respect to selected tubular members or a core member associated with the tubular members.

Accordingly, an object of this invention is to provide an improved pneumatic transmission system made up of a core member enclosed by a plurality of stranded tubular members, wherein the tubular members are stranded with a reversing lay about the core member, thereby permitting the tubular members to be readily displaced and to expose the core member for tapping.

Another object of this invention is to provide a pneumatic transmission system of the character described wherein the core member may comprise either a single tubing, or a plurality of tubings or electrical conductors.

A further object of this invention is to provide a transmission system of the character described wherein the tubular members and core may be formed of synthetic resin or metal; and further, may be transversely corrugated to provide flexibility.

DESCRIPTION OF THE PREFERRED EMBODIMENTS

Figure 1:
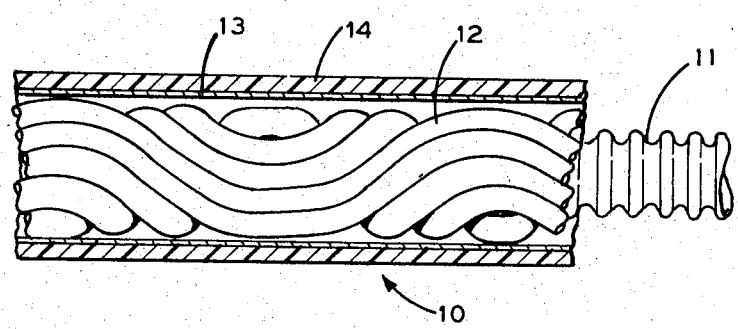
FIG. 1 is a side elevational view, with parts in section, showing a pneumatic transmission system of the instant invention.

As shown in FIG. 1, 10 designates a pneumatic system for transmitting test or control pulses to a remote installation, not shown. The system 10 comprises an elongated core member 11 in the form of a transversely corrugated metal tubing of thin copper or other suitable metal, metal alloy or synthetic resin.

Figure 3:
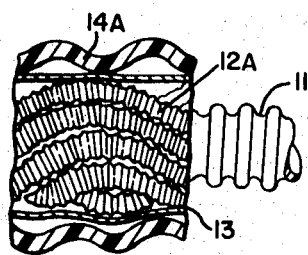
FIG. 3 is a view similar to that of FIG. 1, showing a modified form of the invention.

A plurality of flexible tubular members 12 are stranded about core member 11; the members 12 being formed of metal or synthetic resin, and may also be corrugated as at 12A to increase the flexibility thereof, see FIG. 3.

The members 12 are stranded with a reversing lay and are held in their stranded relation by a tape 13 wound concentrically about said members 12. To protect the system 10 against external influences including temperature fluctuations, mechanical stresses and the like, a sheathing 14 is applied over members 12 and tape 13. The sheathing 14 is formed of synthetic resin which may be reinforced by metal or glass fiber strands. Polyvinyl chloride or polyethylene is particularly suited for forming sheath 14. Alternatively, sheathing 14 may take the form of a corrugated metal tubing indicated at 14A in FIG. 3.

Figure 2:
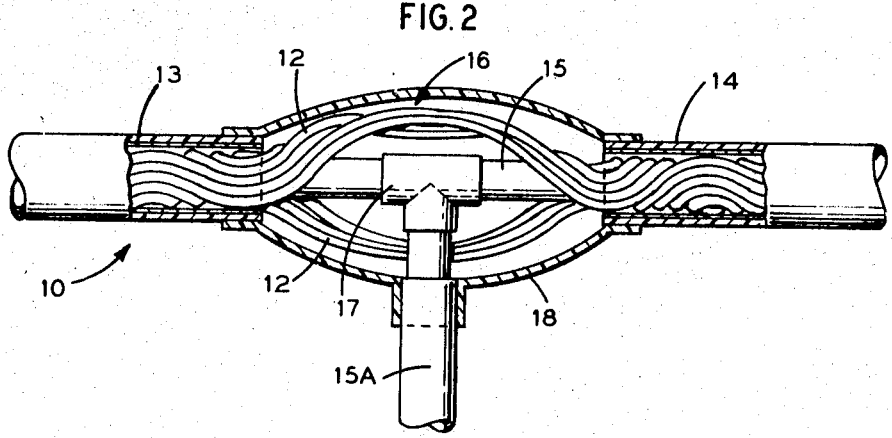
FIG. 2 is a view similar to that of FIG. 1, showing a tap in the core member of the transmission system.

As shown in FIG. 2, the core member 15 is shown as a tubing which is to be tapped to provide a junction tubing 15A. To this end, the sheathing 14 is cut to expose the tubular members 12 which are displaced as at 16 to expose tubing 15 which is provided with a T-connector 17 for connection to tubing 15A. A housing of plastic material, indicated at 18 is used to protect the junction area.

It is understood that the materials from which tubular members 11, 12 and 15 are formed, is determined by the nature of the pneumatic fluid, its temperature and pressure. Also, the core member of the system may take the form of a single or multiple tubing; or one or more electrical conductors in insulated cable form.

What is claimed is:

1. A transmission system comprising a tubular transmitting core member, a plurality of flexible tubular transmitting members stranded concentrically about said core member, at least a portion of said flexible tubular members being stranded with a reverse lay to permit displacement thereof and to expose an opposed portion of said core member, and sheath means enclosing said core member and said flexible tubular members.

2. A transmission system as in claim 1, wherein said tubular core member is transversely corrugated.

3. A transmission system as in claim 1 wherein said stranded tubular members are formed of synthetic resin.

4. A transmission system as in claim 1 wherein said stranded tubular members are formed of metal.

5. A transmission system as in claim 4, wherein said metal tubular members are transversely corrugated.

6. A transmission system as in claim 1 wherein said sheath means is formed of synthetic resin.

7. A transmission system as in claim 1 wherein said sheath means comprises corrugated metal tubing.

8. A transmission system as in claim 1 and further including a junction tubular member coupled to the exposed portion of said core member.

* * * * *